United States Patent Office 3,325,340
Patented June 13, 1967

3,325,340
SUSPENSIONS OF SILICATE LAYER MINERALS AND PRODUCTS MADE THEREFROM
George Forbes Walker, Blackburn, Victoria, Australia, assignor to Commonwealth Scientific and Industrial Research Organization, East Melbourne, Victoria, Australia, a body corporate
No Drawing. Filed Dec. 18, 1962, Ser. No. 245,421
Claims priority, application Australia, Dec. 22, 1961, 12,714/61
10 Claims. (Cl. 161—168)

This invention relates to the production of suspensions of silicate layer minerals, and to the production of films and coatings therefrom.

According to the invention the solid phase of the suspension comprises flakes of vermiculite, and the films and coatings consist essentially of intimately inter-laminated flakes of vermiculite.

The term "vermiculite" is used herein to refer to the group of rock-forming mineral species characterized by a layer lattice structure in which the silicate layer units have a thickness of approximately 10 A., the main elements present in the layers being magnesium, aluminium, silicon and oxygen, the layers being separated by one or two sheets of water molecules associated with cations such as magnesium, calcium, sodium and hydrogen and the layers being of considerable lateral extent relative to the thickness of the basic 10 A. unit layer. The term "vermiculite" as used herein therefore includes minerals consisting wholly or largely of vermiculite, or minerals of a mixed-layer type containing vermiculite layers as an important constituent, such as hydrobiotites and chlorite-vermiculites, but does not include minerals of the montmorillonite group.

The general problem of the production of films and coatings consisting essentially of inorganic mineral material is well known, but few acceptable solutions have been proposed. A naturally flaky mineral such as mica may be mechanically cleaved into flexible thin sheets, and these sheets may then be cemented together in an inter-laminated structure to form a more extensive continuous sheet of any desired thickness within the range permitted by the technique. Thin glass flakes may be subjected to similar techniques of lamination and cementation. Such a technique does not, however, provide a ready means of producing essentially continuous sheets of mineral material in the form of very flexible films having a controlled thickness selected at any point in a range from 0.005 mm. upwards.

A different approach to the problem has been described by Hauser in U.S.A. Patents 2,266,636 and 2,317,685, according to which films and coatings are produced from bentonite (a clay mineral of the montmorillonite group) by taking up the bentonite into an aqueous suspension and then depositing the bentonite on a surface by evaporation of the liquid phase. Since the lateral extent of the individual crystals of the bentonite used in the process is never more than a few microns, the extent of inter-lamination of these crystals with one another is limited to such a degree that the resultant films are not outstanding as regards strength and flexibility. The properties of such films appear to depend largely on the felting together of fibre-like chains of bentonite crystals rather than the simple inter-lamination of flakes to form sheets. Bentonites composed of individual flakes of sufficient lateral extent to be useful in the practical preparation of strong, flexible films are not known to occur in nature.

An ideal film or coating for use in the electrical industry as an insulating material would have the desirable dielectric characteristics of mica, a flexibility and tear strength approaching that of normal papers, a high degree of impermeability and an ability to withstand temperatures up to red heat. Such a material could be envisaged if it were possible to inter-laminate minutely thin but laterally extensive sheets of a silicate mineral resembling mica in general properties. Since bentonites and most other clay minerals do not occur in sufficiently extensive flakes to be satisfactory in such a technique, it is necessary to restrict consideration to macroscopically crystalline minerals of the vermiculite type, where the common occurrence of large sheet-like crystals in natural deposits offers some prospect of preparing a suitable raw material for the production of films and coatings by an inter-lamination technique.

The principal object of the present invention is accordingly to provide a process for the conversion of crystals of vermiculite minerals into sheet-like fragments, each of extreme thinness but relatively great lateral extent, held in suspension in an aqueous medium.

A further object is the production of a suspension which can be used as an exceptionally satisfactory means of depositing films or coatings on surfaces by simple techniques of sedimentation and evaporation.

Another object is the production of a suspension from which coatings may be deposited on suitable surfaces and stripped from the surfaces, after drying out, to yield mineral films having a hitherto unobtainable combination of physical characteristics of considerable value in the field of electrical insulation techniques.

The above objects are achieved in accordance with the invention by means of a process which comprises treating crystals of vermiculite with a solution containing a cation capable of promoting gross swelling of the crystals in a direction normal to the main cleavage plane of the crystals during immersion of the crystals in water subsequent to said treatment, immersing the treated crystals in water, and subjecting the resulting swollen crystals whilst immersed in water to intense mechanical shearing to form a suspension of vermiculite flakes.

In the suspension thus produced, each particle represents a cleavage fragment of one of the original vermiculite crystals, separated from the original mass by virtue of a weakening of the forces which originally acted across the cleavage planes, this weakening being achieved by the entry of a great excess of water into the inter-layer region of the crystal during the swelling stage of the process.

The invention also extends to a process for the production of vermiculite films, wherein the suspension produced by swelling and mechanically shearing the vermiculite crystals is applied to a surface as a layer, which is allowed to dry out by evaporation to form a vermiculite coating comprising highly inter-laminated flakes. If the surface is extremely smooth and is made of a material chemically unaffected by the presence of water, it is then possible in accordance with the invention to form an unsupported vermiculite film by peeling the coating from the surface. The extremely flexible and strong properties of such a film of vermiculite are due to the great extent of overlapping of individual sheets of the disaggregated crystals of the parent mineral and to the particularly strong adhesive forces generated between these individual sheet components by the high surface charge density known to be characteristic of vermiculite layers.

The individual flakes in a suspension of vermiculite flakes in accordance with the present invention normally have approximately equal length and breadth dimensions but a relatively minute thickness, for example, of the order of one ten-thousandth part of the length or breadth dimension. Such a suspension, in substantially pure water as a liquid phase, possesses properties which make it useful in the production of coatings, films, suspending vehicles for paint pigments, gels and foams. For such applications, however, care must be taken to prepare the original suspension in the dispersed or deflocculated state in a water medium rendered substantially free from all dissolved salts, and desirably without mechanically reducing the general geometrical anisotropy of the mineral flakes by permitting excessive tearing of these during the process of disrupting the swollen crystals by shear.

Since the useful characteristics of the suspension in accordance with the present invention are primarily due to the extreme shape anisotropy of the flakes, as long as the shape anisotropy is retained the actual particle sizes of the flakes may be varied over a considerable range with only secondary characteristics becoming evident. For example, suspensions may be prepared containing large proportions of flakes having a thickness little or no greater than the limiting minimum, which is the thickness of the unit silicate layer of the vermiculite structure, with a dimension of almost exactly one milli-micron. In such suspensions the flakes may have approximately equal length and breadth dimensions approaching 100 microns. Alternatively, coarser suspensions may be prepared which comprise flakes of a thickness 0.01 micron, and such flakes would preferably have a length and breadth dimension each approaching 1000 microns to preserve the desirable characteristics of the system.

In a typical process in accordance with the invention for the production of a dispersed vermiculite suspension having properties which make it useful in the production of coatings and films, the first step is the preparation of gel-like swollen crystals of vermiculite by soaking the natural mineral, broken down mechanically into crystals having dimensions generally between 0.1 mm. and 10.0 mm., in a solution containing a cation capable of diffusing into the interlayer hydration sheets of the mineral structure and being retained therein in such a manner as to generate osmotic pressures within the mineral on subsequent washing of the particles with water, whereby the individual silicate layers of the mineral structure are eventually forced apart in the washing water and the main cleavage of the particles is preferentially opened up. With careful handling a collection of the individual mineral crystals may be obtained, immersed in water substantially free from the chemical substance used, each crystal being swollen to about 30 times its original dimension in a direction normal to the main cleavage but showing little or no rupture along the secondary cleavages in the length and breadth directions of this mineral with its typically micaceous habit. Of the various cations capable of causing vermiculites to swell to this extent, the most effective are alkylammonium cations having between 3 and 6 carbon atoms inclusive in each alkyl group, especially those of n-butylammonium, iso-butylammonium, propylammonium and iso-amylammonium. Also effective are the cationic form of amino-acids, such as lysine or ornithine, and the lithium cation. Solutions of the salts of these cations with a strength of 0.5 M or more may be used with good effect.

Following the preparation of the swollen vermiculite crystals and removal of all unadsorbed chemicals by washing with distilled water, the gel-like crystals, immersed in water, are disintegrated by passage through a colloid mill or similar type of shearing macerator. In this stage of the process the aim is to separate the individual silicate layers of the mineral as completely as possible by cleaving the swollen particles along the water-distended main cleavage planes. Repeated passage through a colloid mill of the counter-rotating disc type is a satisfactory method of producing a useful dispersion. A Waring Blendor or a macerator of a type similar to those used for domestic or culinary purposes can also be employed for this purpose. Since the thickness of the cleavage fragments so produced is drastically reduced, there is inevitably considerable tearing across the secondary cleavages, so reducing the area of the flakes, but in general the desired shape anisotropy of the particles can be preserved to a useful extent even throughout prolonged milling provided extreme turbulence or impact is avoided.

The following examples illustrate specific processes for the production of vermiculite suspensions, according to the invention. It is to be understood, however, that the invention is not limited thereto.

Example 1

A 1 kg. sample of vermiculite (10–72 B.S.S. size fraction) was refluxed for 4 hours in a solution of 150 g. n-butylammonium chloride crystals dissolved in 5 l. water. The vermiculite was then washed with distilled water, by decantation, until swelling was observed and allowed to stand in distilled water at room temperature for 2 hours to allow maximum swelling to develop. The solids content of the mixture was adjusted to approximately 5 percent by weight and the mixture introduced into a shearing macerator for between 5 and 30 minutes depending on degree of fineness of dispersion desired. A free-flowing dispersion of vermiculite flakes was thus formed.

Example 2

A procedure identical to that in Example 1 was adopted for the production of similar vermiculite dispersions using iso-amylammonium, iso-butylammonium, or n-propylammonium chloride treatments in lieu of n-butylammonium chloride.

Example 3

A 1 kg. sample of vermiculite (10–72 B.S.S. size fraction) was refluxed for 4 hours in a solution of 1 kg. LiCl crystals dissolved in 2 l. water. The sample was then washed and treated as for Example 1.

Example 4

A 100 g. sample of vermiculite (44–100 B.S.S. size fraction) was added to 250 ml. of a 0.5 M solution of lysine monohydrochloride and the mixture heated at 50° C. for 3 days. The sample was washed with distilled water and treated as in Example 1, except that the washed crystals were left overnight to develop maximum swelling.

Example 5

An identical procedure to that in Example 4 was used for treatment of a vermiculite sample with ornithine monohydrochloride.

The above examples relate to vermiculite from Young River, Western Australia. The treatments outlined in the foregoing examples may require variation in detail for other vermiculites, e.g. the commercially available vermiculties from Libby, Mont., and from Palabora, South Africa require refluxing for 6 hours whereas 4 hours suffices for the Australian vermiculite. Moreover, the South African vermiculite does not swell or subsequently disperse satisfactorily on treatment with lithium salt solutions. The other treatments, however, give a satisfactory product with this vermiculite.

With the preparation of a suspension of vermiculite flakes by means of a process in accordance with the invention, the main object is attained, and any of the various possible modes of application of the suspension may then be undertaken. For example, the suspension may be poured out in a layer over a level surface of polished glass and then evaporated slowly to leave a thin even coating of inter-laminated flakes of the silicate layers which were originally components of the vermiculite structure. If the glass surface is pre-treated with a water-repellent grease or similar release agent, the coating formed by evaporation of the suspension may readily be peeled off in a continuous film.

This pretreatment is not necessary if, instead of glass, a tile having a glaze containing titanium dioxide is used.

A continuous process for the production of such films can be achieved by the use of a moving belt made of a suitable material such as stainless steel. The aqueous dispersion of vermiculite is flowed on to the belt to provide a uniform layer of the desired thickness and the water is evaporated rapidly by a current of hot moist air, at a temperature of about 100° C. The use of hot dry air is unsatisfactory because of the tendency for a "skin" of the finer flakes to form on the surface of the water, which slows evaporation from the surface and also interferes with the formation of the desired type of film. The addition of traces of surface active agents also aids in minimising this "skin" formation.

Suspensions used for the production of films by either of the above techniques usually contain about 5% by weight of solid material. At higher concentrations, even at 10% solids, the platelets of vermiculite are too crowded to orientate themselves in the manner necessary for the production of satisfactory films.

The suspension may be applied to the plate, tile or belt in a layer which is of the order of 3 to 4 mm. in thickness, but this is not critical.

Another example of the application of the suspension is the use of the suspension to form a coating on metal foil, either by dipping the metal in a suspension thickened by evaporation, or by evenly spraying a thinner suspension over the metal surface, the wet coating obtained by either procedure then being slowly dried by evaporation to form an adherent mineral coating.

Coatings may also be produced by electrolytic deposition.

Films peeled off smooth surfaces have a bursting strength and flexibility of the same order as paper, have electrical properties under dry conditions which are comparable with those of high-grade sheet mica, will resist temperatures up to about 900° C., and may be prepared in any desired thickness without difficulty.

The bursting strengths of typical films were measured on a standard Ashcroft Paper Tester, and gave values equal to or better than good quality writing paper tested on the same machine. Values of bursting strength averaged from a large number of trials at different thicknesses were as follows:

| Film thickness in thousandths of an inch: | Bursting strength in lbs. per square inch |
|---|---|
| 3 | 35 |
| 2 | 28 |
| 1 | 15 |
| 0.5 | 8 |

Immediately after drying at 100° C., to remove adsorbed moisture, the films show good electrical insulating properties, which deteriorate gradually over several hours due to the re-adsorption of moisture from the air, but can be regenerated by further drying. Averaged values from a large number of trials were:

Specific resistivity _____ ohm/cm__ $2 \times 10^{17}$
Dielectric strength _____ v./ml__ 1000
Dielectric constant _____ 5

Loss angle at various frequencies as follows:

| Tan δ: | Megacycles per second |
|---|---|
| 0.050 | 0.15 |
| 0.035 | 1.0 |
| 0.035 | 5.0 |
| 0.042 | 15.0 |

Complex films consisting of inter-laminated vermiculite flakes intimately mixed with other substances can be obtained by mixing a dispersion of the second substance with the vermiculite dispersion prior to evaporation. In this way the properties of the resulting films can be modified in a desired manner. For example, mixing an aqueous dispersion of zinc oxide with the vermiculite dispersion followed by evaporation of the liquid phase produces films with photoconducting properties. Similarly, films with markedly different electrical properties can be formed by evaporating vermiculite dispersions to which colloidal gold has been added.

An example of a mixed film follows:

Example 6

An aqueous dispersion of colloidal graphite ("Aquadag") was added to a vermiculite dispersion made according to Example 1, so that the solids content of the resultant mixture was one part by weight colloidal graphite to four parts vermiculite. The mixture was stirred vigorously and the mixed suspension evaporated on to a smooth surface to form a coating. When dry, the coating was stripped from the surface. A film of 0.3 thousandths of an inch thickness made in this way shows less than one percent transmission in the wave length range 1–15 microns, that is to say, it is effectively opaque to infra-red vibrations in the range specified. Such a film is not notably less strong mechanically than a 100 percent vermiculite film. By varying the thickness of the film it is of course possible to alter its content of graphite in either direction, and at the same time to retain its opacity.

In addition to complex film of this type, coherent sandwich-type structures can be produced consisting of alternating vermiculite films and films of other substances. Metals, for example, can be evaporated on to a vermiculite film and a second vermiculite film can then be laid down on the exposed metal surface, and this can be repeated as often as desired.

It will be apparent that treatment of the vermiculite films after their formation with agents designed to modify secondary characteristics such as colour, water resistance and the like can readily be effected by such techniques as soaking the films in solutions of dyes or electrolytes. For example, vermiculite films can be water proofed very effectively by application of water proofing agents such as "Quilon M."

Moreover, treatment of the films with strong solutions (greater than 1 M) of electrolytes containing polyvalent inorganic cations, such as magnesium chloride or aluminum chloride, leads to the displacement of the interlayer cations originally introduced into the crystals in order to effect swelling, for example, butylammonium or lysine, and which are still present in the films. A suitable treatment is to immerse the films in such a solution at room temperature for a period of 2 hours. Whereas the untreated films are not water resistant and tend to swell and disintegrate when immersed in water, films treated in this way retain their full strength when thoroughly wetted with water.

It may therefore be seen that the production in accordance with the invention of a dispersed suspension of sheet-like silicate mineral layers is a key technique capable of opening up numerous valuable practical applications.

I claim:

1. A process for producing an aqueous suspension of vermiculite flakes, which comprises the steps of treating crystals of vermiculite with a solution containing a water soluble salt of a cation selected from the group consisting of the n-butylammonium, iso-butylammonium, 1-methylpropylammonium, n-propylammonium, 1-methylbutylammonium, 2-methylbutylammonium, iso-amylammonium, lithium, lysine and ornithine cations to promote gross swelling of the crystals in a direction normal to the main cleavage plane of the crystals during immersion of the crystals in water subsequent to said treatment, immersing the treated crystals in water, and subjecting the resulting swollen crystals while immersed in water to intense mechanical shearing to form a stable suspension of vermiculite flakes, the majority of which have approximately equal length and breadth dimensions not exceeding about 100 microns and a thickness of one hundred-thousandth to one ten-thousandth part of said length and breadth dimensions.

2. A process according to claim 1; wherein said water soluble salt of the selected cation is the chloride salt of the latter.

3. A process for producing an aqueous suspension of vermiculite flakes, which comprises the steps of mechanically breaking down a vermiculite mineral into crystals having dimensions generally between 0.1 mm. and 10 mm., soaking the crystals in a solution containing a water soluble salt of a cation selected from the group consisting of the n-butylammonium, iso-butylammonium, 1-methylpropylammonium, n-propylammonium, 1-methylbutylammonium, 2-methylbutylammonium, iso-amylammonium, lithium, lysine and ornithine cations which is capable of diffusing into the interlayer hydration sheets of the mineral and being retained therein in such manner as to generate osmotic pressures within the mineral on subsequent immersion of the crystals in water, washing the treated crystals with water in which the crystals are immersed and exchanging such water until it is substantially free of the cation used and then continuing the immersion of the crystals in the water to cause the individual silicate layers of the crystals to be forced apart and the main cleavage preferentially opened up, and subjecting the resulting swollen crystals while immersed in water substantially free of the said cation to intense mechanical shearing to form a stable suspension of vermiculite flakes the majority of which have approximately equal length and breadth dimensions not exceeding about 100 microns and a thickness of one hundred-thousandth to one ten-thousandth part of said length and breadth dimensions.

4. A process according to claim 3; wherein said water soluble salt of the selected cation is the chloride salt of the latter.

5. A process for producing a coating of overlapping vermiculite flakes, comprising the steps of producing a suspension of vermiculite flakes by the process according to claim 3, applying the suspension so produced to a surface and evaporating the water from the suspension to form a coating on the surface.

6. A process for producing a coherent film of overlapping vermiculite flakes, comprising the steps of producing a coating of vermiculite flakes by the process according to claim 5, and stripping the coating from the surface to form a film.

7. A process for producing a coherent film of overlapping vermiculite flakes, comprising the steps of producing a suspension of vermiculite flakes by the process according to claim 3, applying a layer of the suspension of vermiculite flakes, in a concentration of less than 10% solids, to a surface, drying the layer, removing the layer of dried suspension from the surface, and treating the layer with a strong solution of an electrolyte containing a polyvalent inorganic cation selected from the group consisting of magnesium chloride and aluminum chloride, thereby to replace the cation specified in claim 3 with said polyvalent cation and produce a water resistant film.

8. A suspension in water of vermiculite flakes produced substantially in accordance with the process of claim 1.

9. A coating of overlapping vermiculite flakes produced substantially in accordance with the process of claim 5.

10. A coherent film of overlapping vermiculite flakes produced substantially in accordance with the process of claim 6.

References Cited

UNITED STATES PATENTS

| | | | |
|---|---|---|---|
| 2,266,636 | 12/1941 | Hauser | 161—206 |
| 2,405,576 | 8/1946 | Heyman | 161—171 |
| 2,538,236 | 1/1951 | Denning | 161—206 |
| 2,842,183 | 7/1958 | Gaines | 161—171 |
| 3,001,571 | 9/1961 | Hatch | 264—110 |

OTHER REFERENCES

Walker et al.: "Clays and Minerals," Proceedings of the Ninth National Conference, July 6, 1962, pp. 557–567.

Walker: "Nature," vol. 187, No. 4734, pp. 312–313, July 23, 1960.

Walker et al.: "Nature," vol. 191, No. 4796, p. 1389, Sept. 30, 1961.

ALEXANDER WYMAN, *Primary Examiner.*

EARL M. BERGERT, *Examiner.*

W. J. VAN BALEN, *Assistant Examiner.*